United States Patent
Young

[15] 3,655,480
[45] Apr. 11, 1972

[54] HEATING PARISON PREFORMS IN LIQUID FLUORINATED ORGANIC COMPOUND

[72] Inventor: Richard K. Young, Bartlesville, Okla.
[73] Assignee: Phillips Petroleum Company
[22] Filed: Aug. 18, 1969
[21] Appl. No.: 850,782

[52] U.S. Cl..............................156/256, 156/244, 156/308, 156/322, 263/2 R, 264/98, 264/150, 264/234, 264/322
[51] Int. Cl....................B29c 17/07, B29c 17/14, B29f 3/08
[58] Field of Search....................................264/94–97, 234, 264/98, 99, 150; 260/583 GG; 263/2 R; 156/155, 7, 9, 308, 11, 320, 22, 256, 244

[56] References Cited

UNITED STATES PATENTS

| | | | |
|---|---|---|---|
| 2,616,927 | 11/1952 | Kauck et al. | 260/583 GG |
| 3,288,317 | 11/1966 | Wiley | 264/98 |
| 3,390,426 | 7/1968 | Turner et al. | 264/98 |

Primary Examiner—Robert F. White
Assistant Examiner—Gene Auville
Attorney—Young and Quigg

[57] ABSTRACT

Parison preforms are heated to orientation temperature in a liquid fluorinated organic compound bath. The thus heated parisons can be sealed, stretched and blow molded to give oriented hollow articles such as bottles.

7 Claims, 2 Drawing Figures

PATENTED APR 11 1972

3,655,480

INVENTOR.
R. K. YOUNG

BY Young & Quigg

ATTORNEYS

HEATING PARISON PREFORMS IN LIQUID FLUORINATED ORGANIC COMPOUND

BACKGROUND OF THE INVENTION

This invention relates to the heating of parison preforms preparatory to blow molding.

Blow molding concepts have been known for over 100 years and have traditionally involved the downward extrusion of a molten tubular parison with the subsequent closing of a mold cavity about said parison. Thereafter, fluid pressure is introduced into the interior of the parison to cause same to expand out into conformity with the mold walls which chill the molten material and thus cause it to solidify.

In recent years, there has been developed a technique whereby high strength, surprisingly clear hollow articles can be produced from 1-olefin polymers and the like by first forming a parison preform which is cooled to a temperature below the crystalline melting point of the polymer constituting the preform. The preform is then reheated to within 1°-50° of the crystalline melting temperature, stretched axially, and introduced into a mold cavity where it is expanded by internal fluid pressure to cause circumferential orientation and conformity to the shape of the mold cavity. Such techniques are broadly disclosed in Wiley, U.S. Pat. No. 3,288,317, and Turner et al., U.S. Pat. No. 3,390,426, for instance.

This technique results in hollow articles such as bottles having exceptionally desirable properties; however, the most economical means of forming the parison preform is to continuously extrude a tubular material and thereafter cut this continuous tubular extrudate into individual work pieces. This, however, yields a work piece which must be closed at one end in order to blow a closed end hollow article such as a bottle. Furthermore, the work piece must be heated substantially uniformly in order to achieve satisfactory orientation. Thus, in order to take advantage of the most economical method of forming the parison preforms, the artisan is faced with the problem of achieving two apparently incompatible ends, that of quickly heating the parison uniformly to a temperature just below the crystalline melting point and at the same time effecting a sealing of one end while at this relatively low temperature.

One method of reheating is to pass the parisons through an air oven. Because of the poor heat transfer in such a system, however, it would be desirable to utilize some method of achieving better heat transfer. The parisons can be heated in a solid metallic heating block, but since one of the advantages to forming biaxially oriented materials is their greater clarity, there is the need for great care in such heating methods or else the parison preform will become scratched or scuffed and the resulting article will have poorer optical properties. It is well known in the art to utilize liquid baths containing materials such as ethylene glycol to heat thermoplastic materials; however, it has been found that such liquid materials interfere with the subsequent sealing operation which is essential on one end of the parison. Since the parison is at a temperature just below the crystalline melting point, at which temperature it is very difficult to achieve a seal under any conditions, no extraneous material which interferes with the formation of the seal can be tolerated.

SUMMARY OF THE INVENTION

It is an object of this invention to provide for the heating of parison preforms;

It is a further object of this invention to allow the economical production of parison preforms; and It is yet a further object of this invention to provide a method of heating open end parison preforms without interfering with subsequent sealing operations.

In accordance with this invention, a parison preform is heated by contacting it with a liquid fluorinated organic compound.

BRIEF DESCRIPTION OF THE DRAWINGS

In the drawings, forming a part hereof, wherein like reference characters represent like parts in the various views.

DESCRIPTION OF THE PREFERRED EMBODIMENTS

Figure 2:
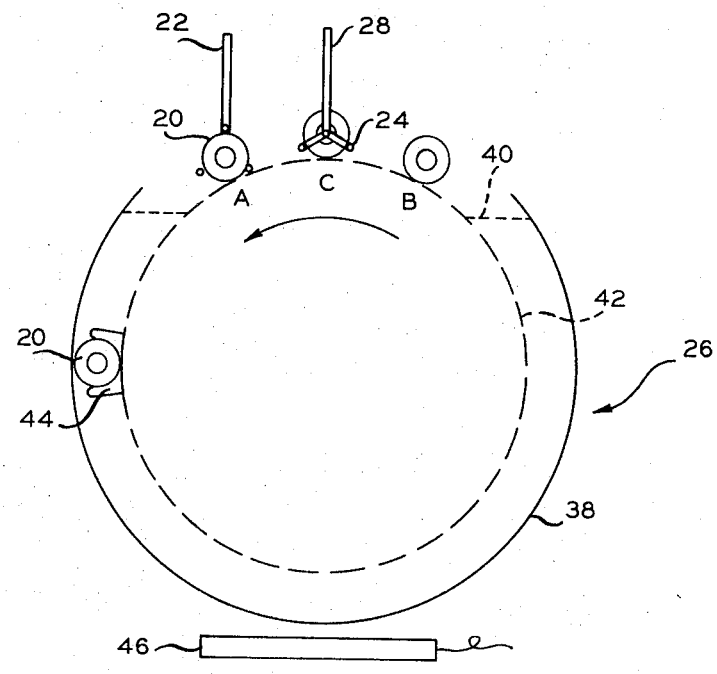
FIG. 2 is a detailed view of the heating chamber of FIG. 1.

The instant invention can be utilized in the heating of parison preforms made from polymers of at least one mono-1-olefin having 2–8 carbon atoms per molecule, preferably polymers and copolymers of ethylene, propylene, and 1-butene, more preferably polypropylene.

The liquid fluorinated organic materials which are suitable for use in the instant invention include any fluorinated organic compound having a boiling point at least as high as the temperature to which it is desired to heat the parison. While lower boiling materials could be used in a sealed system, as a practical matter this would not be feasible because of the difficulty of introducing and removing the parisons. Preferably, the fluorinated organic compound has a boiling point which is no more than 60° F. above the temperature to which the parison is to be heated. This range of boiling points is particularly desirable because they allow heating of the parison without the necessity of maintaining pressure on the system and yet allow entrained fluorinated organic compound on the surface of the heated parison to evaporate quickly after the parison is removed from the bath. For polypropylene, a fluorinated organic compound having a boiling point in the range of 340°–390° F. is particularly satisfactory. These fluorinated organic materials have the further meritorious characteristics of being noncorrosive, nontoxic, nonflammable, and nonreactive with the polymer; in addition, they are readily available from various commercial sources. Specific examples are Freon E-series materials available from Du Pont having the molecular formula

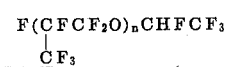

. This material has a boiling point of 381° F. when $n$ is 4. Also suitable are perfluoroalkyl tertiary amines such as perfluorotributylamine. This material is available from 3M under the trade designation FC-43, and having the formula $(C_4F_9)_3N$, and a boiling point of 345° F. Also suitable are perfluoroaliphatic ethers such as $(n\text{-}C_6F_{13})_2O$, which has a boiling point of 357° F.

The instant invention is useful for heating parisons of any thickness. Generally, the parisons will have a wall thickness from 10–500, preferably 120–175, mills.

The time the parison will be in contact with the fluorinated organic compound liquid and the temperature of the bath can vary, depending on the size of the parison and the crystalline melting point of the particular polymer involved. Generally the time will be within the range of 1–20, preferably 1–4, minutes. Even with such short heating times, it is possible to operate with the fluorinated organic compound liquid at a temperature of only 1°–2°, or at most, 10° above the temperature at which the parison is to be heated.

The parison will be heated to a temperature of 1°–50° F., preferably 10°–30° F., below its crystalline melting point, which is the optimum temperature for achieving molecular orientation. The crystalline melting point of the thermoplastic material comprising the parison can be determined by placing a small sample of the polymer on a heating stage of a polarizing microscope and slowly heating until the last birefringence disappears. This temperature is taken as the crystalline melting point.

The 1-olefin polymers are referred to herein as "crystalline" materials and is conventional terminology utilized in the art to describe partially crystalline materials having a crystallinity of about 50 percent and greater.

Meritorious features of this invention include the provision for rapid heating without impairing the ability to seal the resulting heated parison and the fact that overheating problems are minimized since the parisons can get no hotter than the hot liquid; and, since the liquid is maintained at a temperature just above the temperature to which the parison is to be heated, small variations in heating time are not reflected later in variations in bottle quality.

Figure 1:
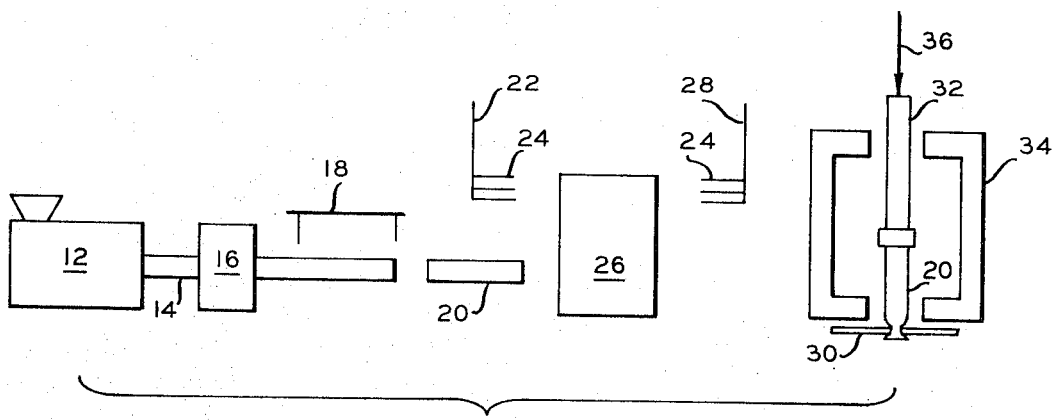
FIG. 1 is a schematic representation of apparatus for forming and reheating parison preforms in accordance with this invention, which preforms are subsequently sealed and stretched preparatory to blow molding.

Referring now to the FIGURES, particularly FIG. 1, there is shown an extrusion means 12 for forming a tubular extrudate 14. Tubular extrudate 14 is passed into vacuum sizing and quenching chamber 16 to cool same to a temperature below the crystalline melting point of the thermoplastic material constituting said extrudate. Thereafter the continuous extrudate moves to a position below cutting means 18 wherein said extrudate is severed into individual work pieces 20. Work pieces 20 are grasped by loading mechanism 22 having gripping prongs 24 and placed into liquid fluorinated organic compound bath 26. After work pieces or parisons 20 have been heated in bath 26, they are removed by means of unloading mechanism 28 having gripping prongs 24 identical to those on loading mechanism 22. Unloading mechanism 28 transfers said thus heated parison to a molding station comprising a sealing means having opposed gripping jaws 30, thread forming head 32, and mold halves 34. In the arrangement shown in this FIGURE, parison 20 is transferred by mechanism 28 into the molding zone and one open end thereof inserted into thread forming jaws 32. Thereafter, unloading mechanism 28 is removed and opposed gripping jaws 30 come together to grasp the other end of the parison. Thread forming head 32 then raises from the position shown in the FIGURE to stretch the parison longitudinally. The mold halves then close on the stretched parison to form a seal and internal fluid pressure is introduced by line 36 to expand same circumferentially and thus into conformity with the shape of the mold. Alternatively, the parison can be sealed by opposed gripping jaws 30 and placed as a free bubble in the mold cavity.

Referring now to FIG. 2, there is shown in detail an end view of fluorinated organic compound bath 26 which is shown in side view in FIG. 1. Bath 26 comprises an outer barrel-shaped reservoir 38 filled to a level indicated by reference character 40 with a liquid fluorinated organic compound. Concentrically mounted within reservoir 38 is cylinder 42 having a parison gripping means. While it cannot be seen from the drawing, the gripping means comprises a pair of gripping jaws 44 disposed at opposite ends of cylinder 42 so as to grip each parison at the ends only. Thus, the only contact of the parison with anything other than the liquid is at the two ends thereof. This avoids marring the parisons by physical contact with solid surfaces. Contact at the ends is permissible since one end is compression molded to form the threads and the other end is sealed and pinched off. The volume of fluid used in the bath is relatively large to minimize temperature fluctuations as the cold parisons are inserted in the apparatus. The parisons are thus introduced into the fluorinated organic compound bath at station labeled by reference character A and passed through the bath by means of the rotation of cylinder 42. After emerging from the bath, the parisons are conveyed to station B at which point the fluorinated organic material entrained on the surface thereof drains off and any remaining fluorinated organic material is vaporized due to the heat in the parison and the closeness of the boiling point to the temperature of the parison. The parisons are then conveyed to station C where unloading mechanism 28 removes them from parison holding jaws 44.

While not shown in the drawings, means can be provided in the draining section, if necessary, to condense any vapors and to return the liquid to the bath. Also, means could be provided to continuously withdraw a part of the bath liquid and pass it through a filter to remove solids and the like and return the purified liquid into the bath. Additional heating means could be employed to raise the temperature of the purified stream to the bath temperature before it entered the bath, or all of the heat could be imparted by means of heater 46. It is apparent that other means could be utilized to heat the fluid such as a submerged electrical resistance heating element or heat exchange means within drum 42.

Means could also be provided to circulate the fluid within reservoir 38, if desired. In particular, means to circulate the fluid in the direction longitudinal to the axis of the parisons so as to insure equal heating of the interior of the parison can be provided, if desired.

Many parts such as temperature controllers, supporting mechanisms, air cylinders, and the like have not been shown for the purpose of simplicity; however, their inclusion is understood by those skilled in the art and is within the scope of the invention.

EXAMPLE I

Polypropylene homopolymer having a density of 0.905 (ASTM D 1505-63T), and a melt flow of about 2 (ASTM D 1238-62T, Condition L), and a crystalline melting point of about 340° F. was extruded into tubing having an internal diameter of 0.8-inch and a wall thickness of 0.125-inch. The tubing was cooled to room temperature and cut into 7-inch lengths. These 7-inch lengths were heated to a temperature of 320° F. by immersing them for a period of 4 minutes in a bath of perfluorotributylamine heated to a temperature of about 322° F. The volume of heating liquid was less than the ideal amount and there was some cooling of the liquid by the parison which necessitated subsequent reheating in this operation. The thus heated parison was transferred to a molding device such as is shown in Turner et al., U.S. Pat. No. 3,390,426, wherein one end of the parison was sealed by means of a 6-member pinching mechanism coming together toward a point and thereafter the parison was stretched, severed, and blown to conform to the shape of the mold cavity to produce a biaxially oriented bottle having high strength wall sections and exceptional clarity. The bottom was found to have a superior seal compared with identical parisons heated in an air oven, presumably because of the improved uniformity of heating obtained.

EXAMPLE II

An identical parison was treated in an identical manner to that of Example I except the heating fluid was Freon E-4 having the structural formula

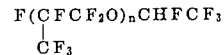

. The resulting heated parison was sealed and blown in a manner identical to that of Example I and the resulting bottle also had a superior seal.

EXAMPLE III

Additional parisons identical to those of Examples I and II were heated in Freon E-4 and perfluorotributylamine at temperatures within the range of 308°-330° F. and the resulting heated parisons sealed and blown into biaxially oriented bottles having a good seal.

CONTROL

Parisons identical to those of Examples I–III were heated in an identical manner to that used in Examples I–III except that ethylene glycol was used as the heating fluid. The resulting heated parisons were placed into the apparatus of Examples I–III in an identical manner but would not seal at all.

Tetrahydrofurfural alcohol n-hexanol were also tried as a heating medium with unsuccessful results.

While this invention has been described in detail for the purpose of illustration, it is not to be construed as limited thereby, but is intended to cover all changes and modifications within the spirit and scope thereof.

I claim:

1. A process for forming closed end parison preforms comprising: extruding a continuous length of a tube of a polymer of at least one mono-1-olefin having 2–8 carbon atoms per molecule; cooling said extrudate to below the crystalline melting point of said polymer; severing said tubing into individual work pieces; introducing said work pieces into a bath of a liquid fluorinated organic compound selected from the group consisting of perfluoroalkyl tertiary amines, perfluoroaliphatic ethers, and compounds having the formula

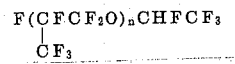

, said compound being at an elevated temperature to heat said parison to a temperature of 0°–50° F. below the crystalline melting point of said polymer; removing said parison from said bath, draining and evaporating said fluorinated organic compound from the surface of said parison; and sealing one end of said thus heated parison by pressing the walls thereof together.

2. A method according to claim 1 wherein said polymer is polypropylene and said fluorinated organic compound has a boiling point within the range of 340°–390° F.

3. A method according to claim 1 wherein said fluorinated organic compound is in contact with said parison for a time within the range of 1–4 minutes.

4. A method according to claim 1 wherein said fluorinated organic compound is selected from the group consisting of

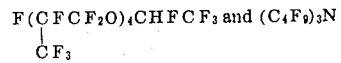

5. A method according to claim 1 wherein said polymer is polypropylene.

6. A method according to claim 5 wherein said parison is heated to a temperature of 10°–30° F. below the crystalline melting point of said polymer.

7. A method according to claim 6 wherein said fluorinated organic compound is selected from the group consisting of

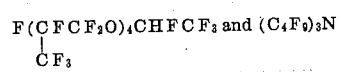

* * * * *

UNITED STATES PATENT OFFICE

CERTIFICATE OF CORRECTION

Patent No. 3,655,480      Richard K. Young      Dated: April 11, 1972

It is certified that error appears in the above-identified patent and that said Letters Patent are hereby corrected as shown below:

Column 5, patent claim 1, line 14, in the formula, "$F(\underset{|}{C}FCF_2O)_n CHFCF_3$" should be --- $F(\underset{|}{C}FCF_2O)_4 CHFCF_3$ ---.
$CF_3$            $CF_3$ Signed and sealed this 29th day of August 1972.

(SEAL)
Attest:

EDWARD M. FLETCHER, JR.        ROBERT GOTTSCHALK
Attesting Officer               Commissioner of Patents